(12) United States Patent
Chiang et al.

(10) Patent No.: US 8,485,334 B2
(45) Date of Patent: Jul. 16, 2013

(54) CLUTCH MECHANISM WITH OVERLOAD PROTECTION

(75) Inventors: Hsin-An Chiang, Taichung (TW); Ching-Fang Hu, Taichung (TW)

(73) Assignee: Hiwin Mikrosystem Corp., Taichung (TW)

( * ) Notice: Subject to any disclaimer, the term of this patent is extended or adjusted under 35 U.S.C. 154(b) by 379 days.

(21) Appl. No.: 13/016,514

(22) Filed: Jan. 28, 2011

(65) Prior Publication Data

US 2012/0193184 A1 Aug. 2, 2012

(51) Int. Cl.
*F16D 7/02* (2006.01)
*F16D 27/01* (2006.01)

(52) U.S. Cl.
USPC ............... 192/56.41; 192/66.31; 192/84.3; 464/29; 464/45

(58) Field of Classification Search
USPC ............ 192/56.4, 56.41, 66.31, 84.3; 464/29, 464/47
See application file for complete search history.

(56) References Cited

U.S. PATENT DOCUMENTS

| | | | | |
|---|---|---|---|---|
| 2,929,477 | A | * | 3/1960 | Rodriguez et al. .......... 192/56.41 |
| 3,085,407 | A | * | 4/1963 | Tomlinson ...................... 464/29 |
| 6,435,971 | B2 | * | 8/2002 | Tanaka ............................ 464/29 |
| 2007/0251796 | A1 | * | 11/2007 | Moshenrose et al. ........ 192/84.3 |

* cited by examiner

*Primary Examiner* — Richard M. Lorence
(74) *Attorney, Agent, or Firm* — Muncy, Geissler, Olds & Lowe, PLLC

(57) ABSTRACT

A clutch mechanism with overload protection provided between a power input shaft and a power output shaft of an actuator includes a magnet set including at least a first magnet and a second magnet that are arranged as magnetically attractive to each other and are attached to the power input shaft and the power output shaft, respectively; and a friction assembly including a first friction member and a second friction member arranged adjacent to each other and between the first magnet and the second magnet, so as to provide a constant friction between the magnets. The magnet set and the friction assembly jointly set a limit of a torque between the power input shaft and the power output shaft. When the torque exceeds the limit, the power input shaft and the power output shaft are disconnected, so as to achieve overload protection.

10 Claims, 6 Drawing Sheets

CLUTCH MECHANISM WITH OVERLOAD PROTECTION

BACKGROUND OF THE INVENTION

1. Technical Field

The present invention relates to clutch mechanisms, and more particularly, to a clutch mechanism with overload protection, which is applicable to motor-driven devices requiring overload protection, such as actuators.

2. Description of Related Art

With the progress of automation, linear actuators have become a vital component in automated machines and are extensively used in electric beds, lift chairs, electric tables, lift platforms, power windows and so on. A linear actuator is conventionally composed of a housing, a motor, a transmission mechanism and a push rod. The motor transfers a rotational motive force to the push rod through the transmission mechanism. The push rod comprises a screw and an extension tube. The screw has a screw shaft and a nut, wherein the nut converts the rotational motive force from the screw shaft into a linear thrust that drives the extension tube attached to the nut so that the extension tube drives a load to move.

In the conventional linear actuator, for protecting the push rod and the load from receiving excessive torque and getting broken, a clutch mechanism is provided and serves to disengage the push rod from the motor when the push rod is jammed or overloaded. Traditionally, the clutch mechanism is realized by an electromagnetic clutch, which has to work with an additional control box incorporating an overload-detection-and-protection circuit and an external power source, so that the power transmission between the motor and the push rod can be controlled with electromagnetic induction. However, after a long term of use, the electromagnetic clutch tends to have its coils worn and thus is not durable. Furthermore, the electromagnetic clutch only provides the actuator with indirect overload protection that completely depends on the external power source. Moreover, since the electromagnetic clutch is designed to perform the functional disengagement when the power is off, it is unsuitable for a system that normally needs engagement, such as a hospital bed, where once the power is off, the weak self-locking force between components thereof may cause any of the components to collapse and hurt the user and people around. In addition, the control box makes the actuator extra bulky, being adverse to a compact layout of the automated machine using such an electromagnetic clutch.

SUMMARY OF THE INVENTION

Summarily, the existing electromagnetic clutch for linear actuators has the shortcomings including that its indirect overload protection can only work when there is power supplied, that it is not durable because the coils tend to get worn after long-term use, and that the control box is adverse to a compact layout of the automated machine. In view of the foregoing shortcomings, the present invention herein provides a clutch mechanism with overload protection.

According to the present invention, the clutch mechanism with overload protection is provided between a power input shaft and a power output shaft of an actuator for coupling and disconnecting the power input shaft to and from the power output shaft. The clutch mechanism comprises a magnet set including at least a first magnet and a second magnet that are arranged as magnetically attractive to each other and are attached to the power input shaft and the power output shaft, respectively; and a friction assembly including a first friction member and a second friction member, wherein the first friction member and the second friction member are arranged adjacent to each other and between the first magnet and the second magnet, so as to provide a constant friction between the magnets.

One objective of the present invention is to provide the clutch mechanism wherein the overload protection is realized by coupling and disconnecting the power input shaft to and from the power output shaft mechanically without using any external power source and control box. Thus, the clutch mechanism has no problem related to worn coils and is more stable and durable while favoring a compact layout of an automated machine using it.

Another objective of the present invention is to provide the clutch mechanism wherein the magnetic attraction of the magnet set makes the clutch mechanism normally establish the power transmission between the motor and the power output shaft, and helps to recover the power transmission after overload protection.

Another objective of the present invention is to provide the clutch mechanism wherein the desired overload protection between the power input shaft and the power output shaft can be customized by designing the friction assembly with different thickness that in turn affect the magnetic attraction of the magnet set, so as to meet various practical needs.

Still another objective of the present invention is to provide the clutch mechanism wherein there is need for any external power source, thus saving power.

Yet another objective of the present invention is to provide the clutch mechanism wherein the magnet set and the friction assembly may be arranged in the retarding mechanism of the actuator, so that by manual operation, engagement and disengagement between the power input shaft and the power output shaft can be rapidly achieved.

BRIEF DESCRIPTION OF THE DRAWINGS

The invention as well as a preferred mode of use, further objectives and advantages thereof will be best understood by reference to the following detailed description of illustrative embodiments when read in conjunction with the accompanying drawings, wherein.

DETAILED DESCRIPTION OF THE INVENTION

Particular preferred embodiments will be described in order to illustrate the concepts of the present invention as provided in SUMMARY OF THE INVENTION. The accompanying drawings are not made to scale but with the proportions, dimensions, deformation and/or displacement favorable to the illustrative purpose. In different drawings, the same numeral is used to indicate the similar components.

Figure 1:
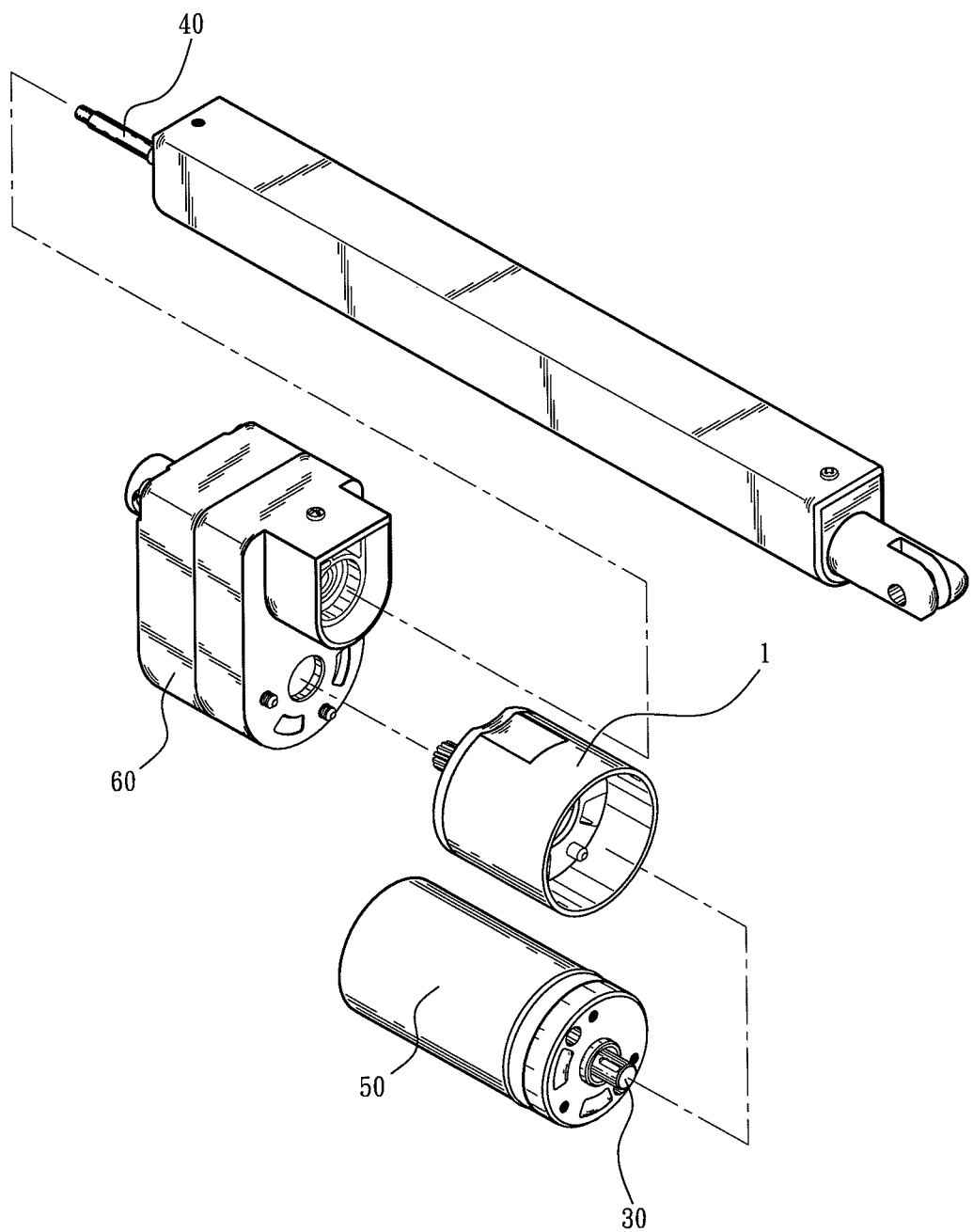
FIG. 1 is a schematic drawing showing a clutch mechanism of the present invention to be applied to an actuator.
Figure 2:
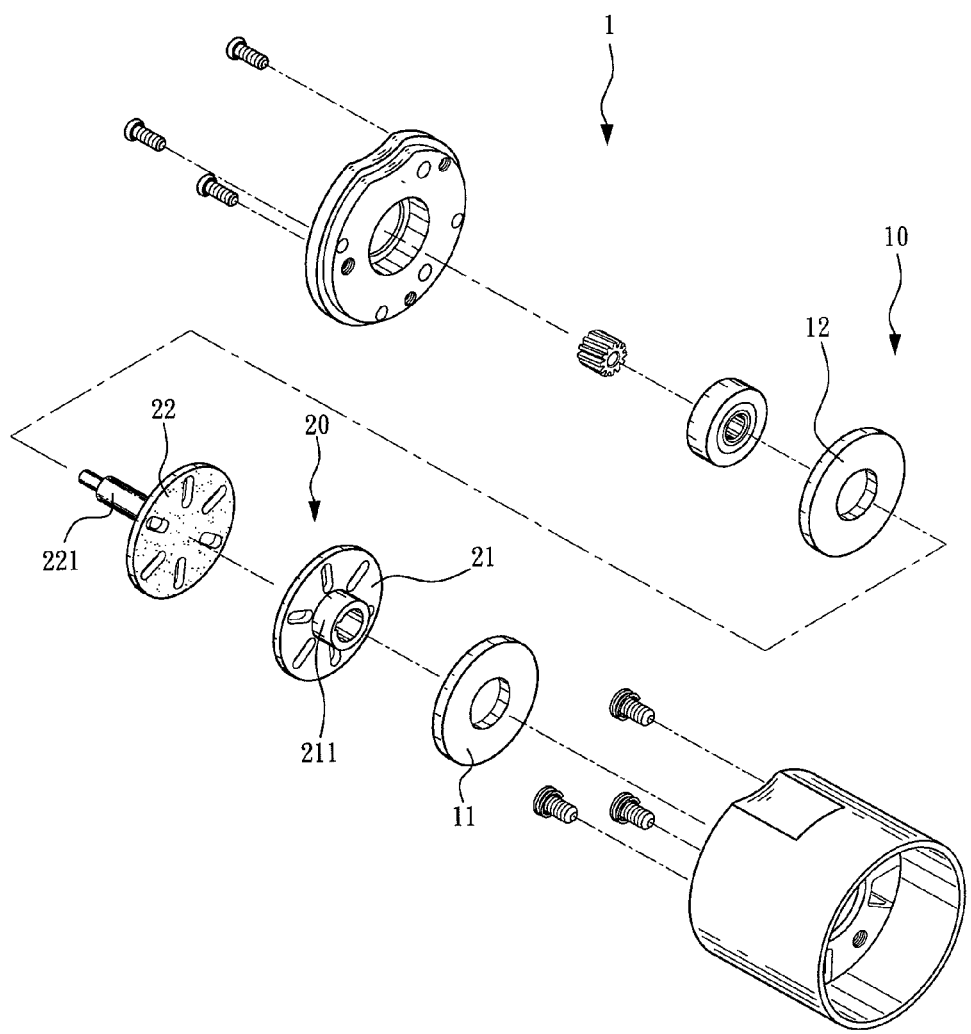
FIG. 2 is an exploded view of the clutch mechanism of the present invention.

Referring to FIG. 1 and FIG. 2, the present invention provides a clutch mechanism 1 with overload protection. The clutch mechanism 1 primarily comprises a magnet set 10 and a friction assembly 20. The clutch mechanism 1 is deposited between a power input shaft 30 and a power output shaft 40 of an actuator. Therein, the power input shaft 30 is driven by a motor 50, and the power output shaft 40 is a screw, while the clutch mechanism 1 controls the power input shaft 30 and the power output shaft 40 to couple with or disconnect from each other.

The magnet set 10 has at least a first magnet 11 and a second magnet 12 that are arranged as magnetically attractive to each other. Each of the first magnet 11 and the second magnet 12 is a permanent magnet. Therein, the first magnet 11 is mounted around the power input shaft 30, and the second magnet is adjacent to the first magnet 11 so that the magnets 11, 12 are magnetically attractive to each other.

The friction assembly 20 comprises a first friction member 21 and a second friction member 22. The first friction member 21 and the second friction member 22 are adjacent and arranged between the first magnet 11 and the second magnet 12, in the form of components made of rubber or plastic, so as to jointly act as a source of friction between the first magnet 11 and the second magnet 12. Therein, the first friction member 21 is axially formed with a sleeve portion 211 extending toward the first magnet 11, so as to allow the first friction member 21 to be mounted around the power input shaft 30. The second friction member 22 is axially formed with a connecting rod 221 extending toward the second magnet 12, so as to allow the second friction member 22 to be connected to a retarding mechanism 60 and the power output shaft 40.

Basing on the structure given above, the operation of the present invention and the principles on which the operation is established are explained in detail below.

Figure 3:
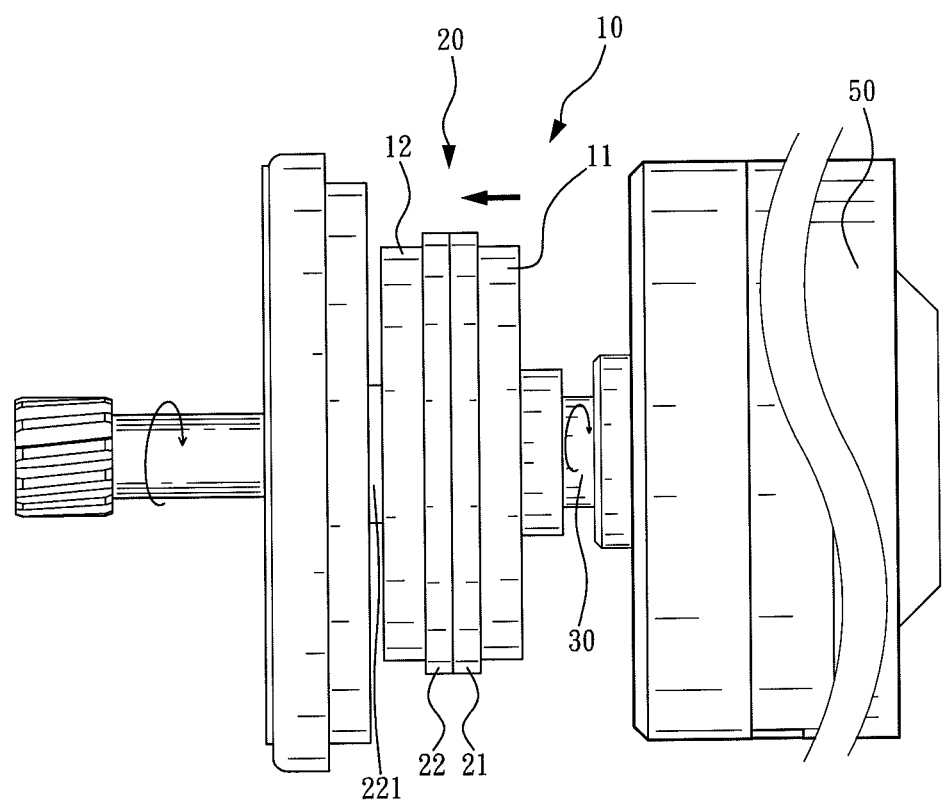
FIG. 3 is a schematic drawing showing the clutch mechanism of the present invention under a normal state of the actuator.

As shown in FIG. 3, normally, the first magnet 11 and the second magnet 12 line close to each other in virtue of the magnetic attraction therebetween. The friction assembly 20 generates a constant friction. When the power input shaft 30 is driven by the motor 50 to rotate, if the torque is inferior to the constant friction, the first friction member 21 and the second friction member 22 are driven together, so that the power transmission between the power input shaft 30 and the power output shaft 40 is established, thereby allowing the actuator to normally perform travel control.

Figure 4:
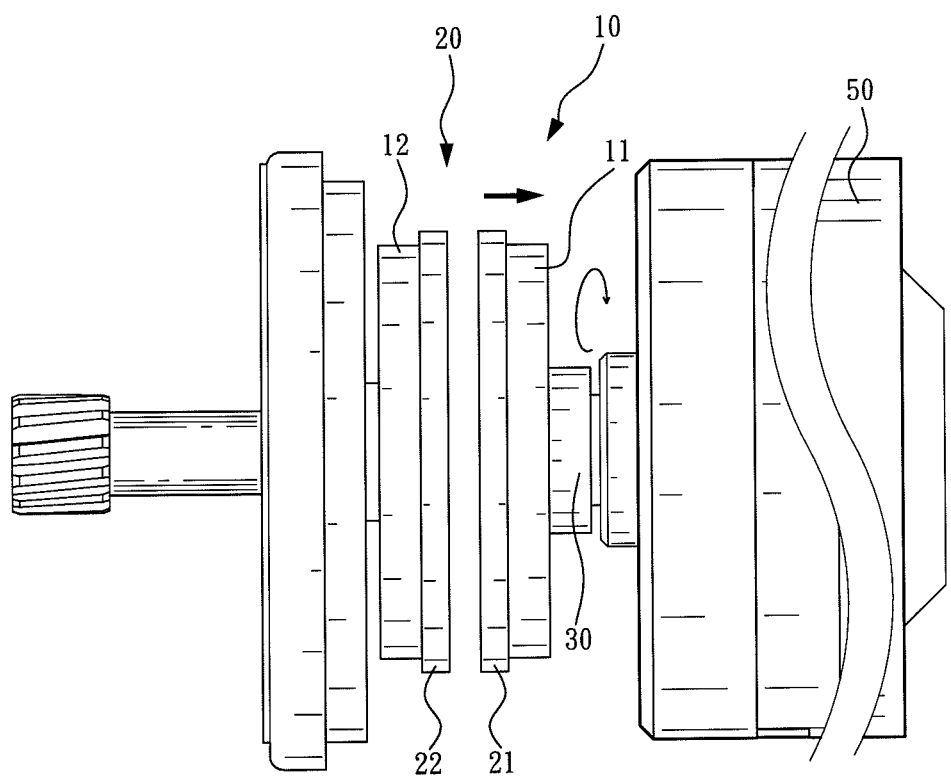
FIG. 4 a schematic drawing showing the clutch mechanism of the present invention under an overload state of the actuator.

Referring to FIG. 4, when a load at the terminal of the power output shaft 30 is over the output limit of the motor 50, or when the power output shaft 30 is blocked from rotation, the torque in transmission is greater than the friction between the first friction member 21 and the second friction member 22, so the first friction member 21 rotates with respect to the second friction member 22. In other words, the first friction member 21 now runs idly without driving the second friction member 22 and the power output shaft 40 to rotate. Thereby, the power input shaft 30 and the power output shaft 40 are disconnected from the power output shaft 40 in terms of transmission and overload protection is thus achieved to prevent the related components from being damaged by the excessive torque.

When the torque returns to a normal range, in virtue of the magnetic attraction between the first magnet 11 and the second magnet 12, the first friction member 21 and the second friction member 22 recover the engagement therebetween due to their friction, so that the power transmission from the motor 50 to the power output shaft 40 can be recovered.

As stated above, the present invention controls the engagement and disengagement between the power input shaft 30 and the power output shaft 40 mechanically. In comparison with the traditional electromagnetic clutch, the disclosed clutch mechanism eliminates the need of any external power source, so has no problem related to worn coils and is more stable and durable. In addition, the desired overload protection between the power input shaft 30 and the power output shaft 40 can be customized by designing the friction assembly 20 with different thickness that in turn affect the magnetic attraction of the magnet set 10, so as to meet various practical needs.

Figure 5:
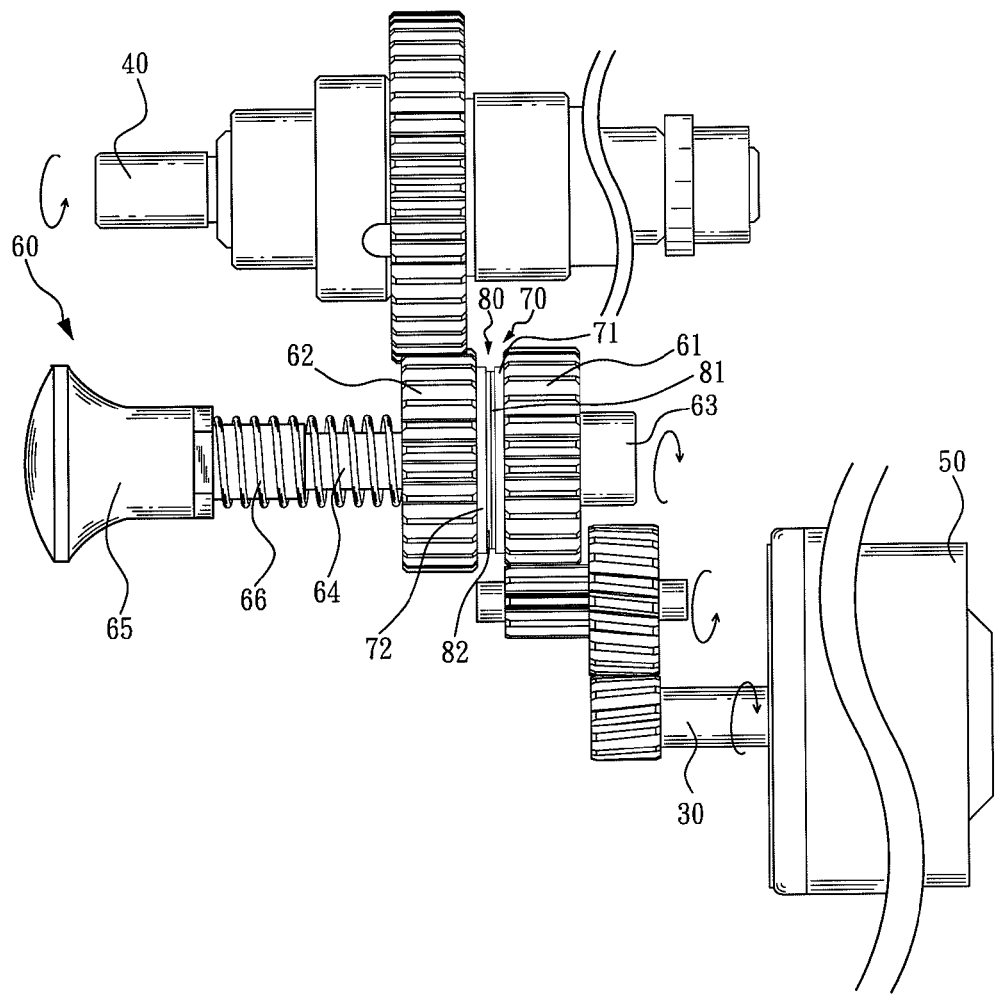
FIG. 5 illustrates a second embodiment of the clutch mechanism of the present invention wherein the actuator is under its normal state.

FIG. 5 shows another embodiment of the present invention. In this embodiment, a magnet set 70 and a friction assembly 80 are deposited in the retarding mechanism 60, so as to control the power transmission of the retarding mechanism 60 by operating the magnet set 70. The retarding mechanism 60 has at least one driving gear 61 and one transmission gear 62. Therein, the driving gear 61 is driven by the power input shaft 30, while the transmission gear 62 drives the power output shaft 40 to rotate. The driving gear 61 is axially formed with a sleeve 63, and an axle 64 is received in the sleeve 63 such that the axle 64 is horizontally movable in the sleeve 63. A first magnet 71 and a first friction member 81 are mounted around the sleeve 63 at an inner side of the driving gear 61. The transmission gear 62 is mounted around the axle 64. A second magnet 72 and a second friction member 82 are mounted around the axle 64 at an inner side of the transmission gear 62. A manual lever 65 is mounted around the axle 64 opposite to the sleeve 63. The manual lever 65 is configured to be manually pulled to shift the axle 64. A spring 66 is provided between the manual lever 65 and the axle 64.

Normally, the first magnet 71 and the second magnet 72 are mutually magnetically attracted and stay close, so that the friction assembly 20 generates a constant friction. When the power input shaft 30 rotates, the driving gear 61 and the transmission gear 62 are driven to rotate together, and in turn rotate the power output shaft 40, so as to establish the power transmission between the motor 50 and the power output shaft 40.

Figure 6:
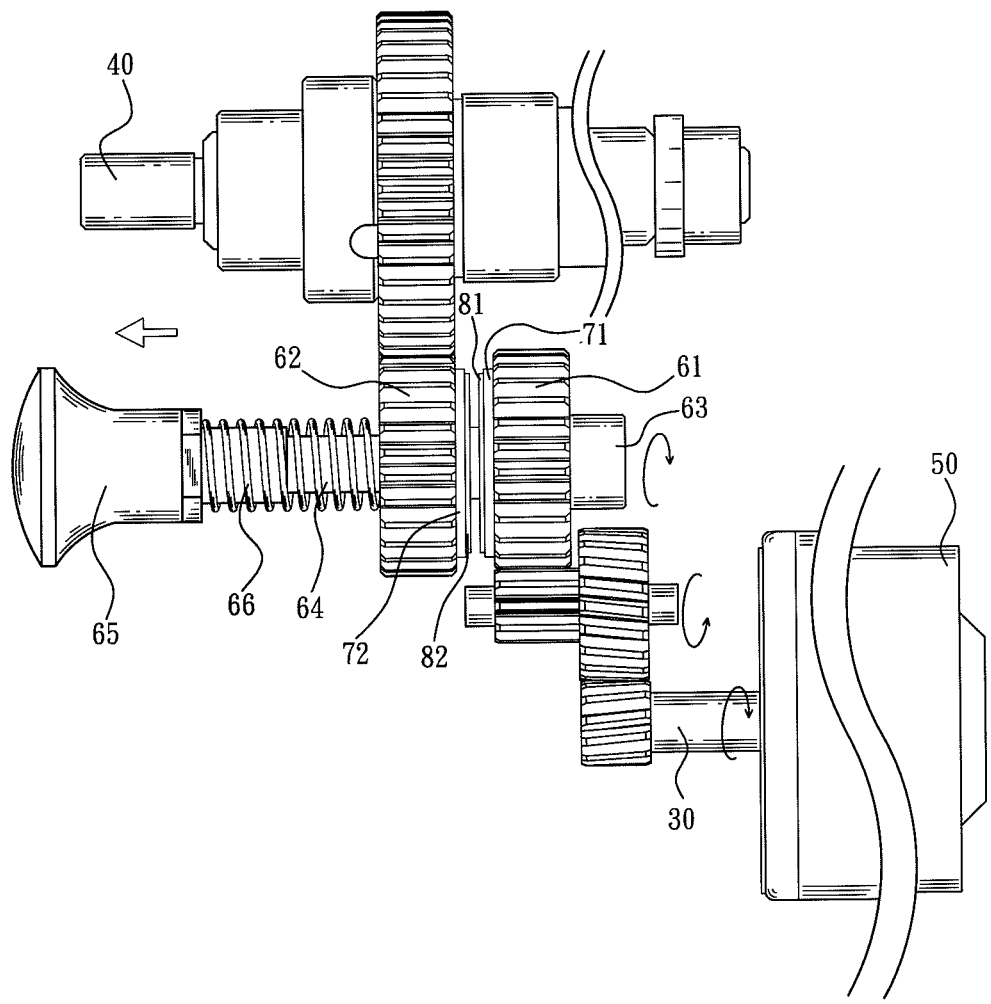
FIG. 6 illustrates the second embodiment of the clutch mechanism of the present invention when the actuator is under its overload state.

Referring to FIG. 6, when it is desired to break the foregoing power transmission, the manual lever 65 may be pulled so that the first friction member 81 and the second friction member 82 are separated from each other. At this time, the transmission gear 62 stays still and becomes independent of the driving gear 61. When the manual lever 65 is released, due to the magnetic attraction of the magnet set 70 and the resilience of the spring 66, the first friction member 81 and the second friction member 82 come close to each other again and recover the friction therebetween, so that the power transmission between the motor 50 and the power output shaft 40 is recovered. By the foregoing manual operation, the power input shaft 30 and the power output shaft 40 can be rapidly coupled with and disconnected from each other.

The present invention has been described with reference to the preferred embodiments and it is understood that the embodiments are not intended to limit the scope of the present invention. Moreover, as the contents disclosed herein should be readily understood and can be implemented by a person skilled in the art, all equivalent changes or modifications which do not depart from the concept of the present invention should be encompassed by the appended claims.

What is claimed is:

1. A clutch mechanism with overload protection, the clutch mechanism being provide between a power input shaft and a power output shaft of an actuator for coupling and disconnecting the power input shaft to and from the power output shaft, and the clutch mechanism comprising:
- a magnet set including at least a first magnet and a second magnet that are arranged as magnetically attractive to each other and are attached to the power input shaft and the power output shaft, respectively; and
- a friction assembly including a first friction member and a second friction member, wherein the first friction member and the second friction member are arranged adjacent to each other and between the first magnet and the second magnets, so as to provide a constant friction between the magnets.

2. The clutch mechanism of claim 1, wherein each of the first magnet and the second magnet is a permanent magnet.

3. The clutch mechanism of claim 1, wherein the first magnet is mounted around the power input shaft.

4. The clutch mechanism of claim 3, wherein the first friction member is axially formed with a sleeve portion extending toward the first magnet by which sleeve portion the first friction member is mounted around the power input shaft, and the second friction member is axially formed with a connecting rod extending toward the second magnet by which connecting rod the second friction member is connected to a retarding mechanism and the power output shaft.

5. The clutch mechanism of claim 1, wherein the magnet set and the friction assembly are deposited in a retarding mechanism, so that a power transmission of the retarding mechanism is established or broken by operating the magnet set.

6. The clutch mechanism of claim 5, wherein the retarding mechanism has at least one driving gear driven by the power input shaft and axially mounted with a sleeve for receiving therein an axle such that the axle is horizontally movable in the sleeve, and a transmission gear being mounted around the axle and coupled with the power output shaft, the first magnet and the first friction member being mounted around the sleeve between the driving gear and the transmission gear and associated with the driving gear, the second magnet and the second friction member being mounted around the axle between the driving gear and the transmission gear and associated with the transmission gear.

7. The clutch mechanism of claim 6, wherein a manual lever is mounted around the axle opposite to the sleeve to be manually pulled for shifting the axle.

8. The clutch mechanism of claim 7, wherein a spring is provided the manual lever and the axle.

9. The clutch mechanism of claim 1, wherein the friction assembly is made of rubber.

10. The clutch mechanism of claim 1, wherein the friction assembly is made of plastic.

* * * * *